United States Patent [19]

Rigge et al.

[11] 3,879,310

[45] Apr. 22, 1975

[54] SURFACE STABILIZED ACTIVE ALUMINA

[75] Inventors: Ronald J. Rigge, Pleasanton; Orrie C. Olsen; Charles T. Goetschel, both of Walnut Creek, all of N.J.

[73] Assignee: Kaiser Aluminum & Chemical Corporation, Oakland, Calif.

[22] Filed: Mar. 26, 1973

[21] Appl. No.: 344,630

[52] U.S. Cl. ............... 252/435; 252/437; 252/463; 423/625; 423/626; 423/628; 260/683.2
[51] Int. Cl. .......................... B01j 11/82; C01f 7/02
[58] Field of Search ................... 423/625, 628, 626; 252/435, 437

[56] References Cited
UNITED STATES PATENTS

| | | | |
|---|---|---|---|
| 2,720,492 | 10/1955 | Ehman | 252/435 X |
| 3,177,151 | 4/1965 | Calvert | 252/435 |
| 3,268,295 | 8/1966 | Armbrust, Jr. et al. | 423/625 |
| 3,391,087 | 7/1968 | Nixon | 252/435 |
| 3,449,436 | 6/1969 | O'Connor et al. | 252/435 |
| 3,647,374 | 3/1972 | Nomura et al. | 423/630 |

*Primary Examiner*—Herbert T. Carter
*Attorney, Agent, or Firm*—Paul E. Calrow; Andrew E. Barlay

[57] ABSTRACT

Surface stabilized active alumina having significantly increased thermal stability is made by incorporating 1–20%, preferably 2–18% by weight $PO_4$-ion (calculated on the weight of the calcined composite) in alumina having an essentially pseudoboehmitic structure. The stabilized active alumina retains its surface area and consequently its activity for prolonged periods under high temperature exposure, for example at 900°C without material deterioration.

11 Claims, No Drawings

SURFACE STABILIZED ACTIVE ALUMINA

BACKGROUND OF THE INVENTION

Active aluminas are widely employed as catalysts, catalyst supports and as desiccants. For most of these applications it is desired to employ aluminas which have relatively high surface area, generally in excess of 100 m²/g, preferably in excess of 150 m²/g. During use and/or subsequent regenerations active aluminas gradually lose surface area with consequent decrease in activity and if the activity deteriorates to a certain degree, measured by loss of surface area, they must be discarded and the apparatus is then recharged with fresh active alumina. The entire manipulation involving discarding of exhausted active alumina and the recharging of the apparatus with fresh active alumina is frequently referred to as "change out." Frequent change outs hurt the economy of the process using active aluminas as they involve considerable down time not to mention the replacement cost of the exhausted active alumina. Consequently, it is of great economic importance to provide active aluminas which retain their activity for extended time periods even under the most severe use conditions.

Many attempts have been made to improve the stability of active aluminas and most commonly addition of silica has been considered as an effective means for increasing the service life. While addition of silica to active alumina acts as a stabilizer and allows the use of silica-stabilized active aluminas for longer periods than nonstabilized aluminas, silica even in small quantities, e.g. 1–20%, can impart strong acidity to the aluminas, which is often called Broensted acidity. Aluminas possessing a high degree of Broensted acidity can act as isomerization and as cracking catalysts and can cause formation of undesired isomers together with the desired ones and also undesired cracking. Thus, in many instances stability of silica stabilized aluminas is outweighed by the lack of selectiveness in isomerization and the formation of undesired cracked products.

It has now been discovered that when pseudoboehmitic alumina is combined with 1–20%, preferably 2–18% by weight $PO_4$-ion (calculated on the weight of the calcined composite), not only an active alumina of significantly increased stability is obtained, but also if the $PO_4$-stabilized alumina is used as an isomerization catalyst due to its low acidity, often referred to as "Lewis acidity," its isomerization characteristics remain selective without formation of uncontrollable and undesirable isomers and it does not cause cracking of organics even under high temperature use.

SUMMARY OF THE INVENTION

Pseudoboehmitic active alumina containing at least about 30% by weight pseudoboehmite is surface stabilized by incorporating in the alumina from about 1% by weight to about 20% by weight, preferably from about 2 to about 18% by weight $PO_4$-ion, calculated on the weight of the calcined composite (calcined at 1000°C for 1 hour). Incorporation of the $PO_4$-ion can be accomplished during the preparation of the pseudoboehmitic alumina or by addition to freshly prepared pseudoboehmitic alumina.

The pseudoboehmitic alumina can be made by either reacting a basic aluminum source, such as sodium aluminate with an acid in an aqueous system, or by reacting a base with an acidic aluminum salt in an aqueous system.

The phosphate stabilized pseudoboehmitic alumina is generally characterized by a surface area of at least 300 m²/g after a 2 hour thermal activation at 600°C and a characteristic X-ray diffraction peak of greatest intensity (I/Io) at 6.5–6.8 A range using copper $K\alpha$ radiation. The $PO_4$-stabilized pseudoboehmitic alumina can be advantageously employed at high temperatures and when used as an isomerization catalyst it retains its selectivity even under severe high temperature uses.

DETAILED DESCRIPTION OF THE INVENTION

This invention relates to a surface stabilized active alumina having significantly increased thermal stability due to incorporating therein 1–20% by weight $PO_4$-ion (calculated on the weight of the calcined composite calcined at 1000°C for 1 hour). More particularly it relates to a surface stabilized pseudoboehmitic activated alumina of high thermal stability and selective isomerization characteristics.

Pseudoboehmitic alumina for the purposes of this invention refers to an alumina prepared by the interaction of a basic aluminum source, such as sodium aluminate or potassium aluminate with an acid, for example $HNO_3$, HCl or $H_2SO_4$, or an acidic aluminum salt, or by the interaction of an acidic aluminum salt with a base. Suitable acidic aluminum salts include $Al(NO_3)_3$, $AlCl_3$ and $Al_2(SO_4)_3$ and organic acids; $Al(NO_3)_3$ being preferred. As a base NaOH is generally employed. The alumina produced by the reaction of these reactants should for the purposes of this invention contain at least about 30% by weight pseudoboehmite, which is defined by a characteristic interplanar distance (020) of about 6.5–6.8 A as determined by X-ray diffraction analysis using copper $K\alpha$ radiation.

The $PO_4$-ion yielding compounds suitable for the purposes of this invention can be characterized by the general formula $A_xH_yPO_4$, wherein A can be Na, K, Li or $NH_4$, x and y are whole numbers from 0 to 3 and the sum of $x + y$ is equal to 3. If A is $NH_4$, x is limited to 1 and 2. Representative examples of phosphate compounds which can be advantageously utilized include $Na_3PO_4$, $NaH_2PO_4$, $Na_2HPO_4$, $K_3PO_4$, $K_2HPO_4$, $KH_2PO_4$, $(NH_4)_2HPO_4$ and $(NH_4)H_2PO_4$.

The incorporation of the $PO_4$-ion stabilizer in the pseudoboehmitic alumina can be accomplished either during the precipitation of the pseudoboehmitic alumina or if desired the phosphate ion stabilizer can be added to freshly precipitated pseudoboehmitic alumina.

If the phosphate ion stabilizer is to be incorporated in the pseudoboehmitic alumina during precipitation, the following alternative methods can be employed. In the event the pseudoboehmitic alumina is made by the interaction of a sodium aluminate solution with aqueous nitric acid, for example in the manner described in detail in U.S. Pat. No. 3,630,670 to N. Bell et al, the phosphate ion stabilizer can be conveniently incorporated either in the nitric acid or in the sodium aluminate solution prior to admixture of these reactants. If incorporation of the phosphate ion stabilizer in the alumina is to be accomplished by addition of the phosphate ion to the nitric acid, advantageously $H_3PO_4$ is used. Conversely, the addition of the phosphate ion stabilizer to the sodium aluminate solution can be accomplished by adding the stabilizer in the form of $Na_3PO_4$ or $Na_2HPO_4$, provided no salting out occurs during the addition.

If desired, however, the phosphate ion stabilizer can also be added simultaneously during the admixture of the sodium aluminate with the nitric acid. Prior admixture of the phosphate ion stabilizer with one of the reactants was found to be more desirable, since it allowed better control of pH conditions. It was also found advantageous to incorporate the stabilizer in precipitated pseudoboehmitic alumina.

This can be accomplished by adding the stabilizer to a slurry of precipitated alumina, to a filter cake of the alumina or to dried pseudoboehmitic alumina. The phosphate stabilizer can be incorporated in the form of aqueous salt solutions and among these salts $(NH_4)H_2PO_4$ or $(NH_4)_2HPO_4$ are preferred. These phosphate salts are easily decomposable during the usual thermal activation step to volatile ammonia and they leave only the phosphate portion in the alumina.

In any event, whether the stabilizer is to be incorporated during or after precipitation, care should be taken to avoid localized over-concentrations of the stabilizer. This can be avoided by dissolving the sodium phosphate in the sodium aluminate solution or by thoroughly mixing the phosphoric acid with the nitric acid.

It was found that surface stabilization of pseudoboehmitic alumina can be achieved by incorporation of as little as about 1% by weight $PO_4$-ion stabilizer. Above about 20% by weight the phosphate stabilizer reduces the crystallite size and converts the pseudoboehmitic alumina to an amorphous product. Best stabilizing results were found by incorporation of from about 2 to about 18% by weight phosphate ion stabilizer, all percentages of phosphate stabilizer being based on the weight of the calcined composite after heating the stabilized pseudoboehmitic alumina to 1000°C for 1 hour.

After incorporation of the phosphate ion stabilizer in the pseudoboehmitic alumina, the alumina is dried by conventional methods at about 100°–150°C, followed by a thermal treatment step in the range of about 300°C and 600°C for a time period of 30 minutes to about 3 hours.

The phosphate stabilized pseudoboehmitic alumina prepared in accordance with the process described exhibits significantly increased surface stability even under severe high temperature use and in addition it possesses selective isomerization characteristics which remain materially unaffected when employed at elevated temperatures. The following Examples and Tables are presented to illustrate these properties.

EXAMPLE I

Stabilized, $PO_4$-containing pseudoboehmitic aluminas containing 1.5%, 2.8%, 8.1%, 16.6% and 23% $PO_4$ by weight, together with a non-stabilized pseudoboehmitic alumina were prepared by the interaction of sodium aluminate with nitric acid. In these tests, the phosphate stabilizer was added in the form of $H_3PO_4$ to aqueous nitric acid containing about 5% by weight $HNO_3$. Sodium aluminate solution containing about 390 g/l NaOH and about 440 g/l $Al_2O_3$ was continuously introduced in a stirred reactor together with the $H_3PO_4$ containing nitric acid at such a rate as to maintain a pH of 7.5 in the reaction mixture. The temperature of the mixture was kept at about 55°C and the residence time of the formed pseudoboehmitic alumina in the reactor was 1 hour. Subsequently, the precipitated pseudoboehmitic aluminas were filtered, washed and dried at about 110°C for about 2 hours. The dried aluminas were then subjected to a thermal treatment at about 550° C–600°C for about 2 hours.

The following Tables show the properties of the phosphate stabilized pseudoboehmitic aluminas prepared according to the present invention.

TABLE I

Physical Properties of $PO_4$ Stabilized Pseudoboehmitic Active Aluminas After Thermal Activation at 600°C for 2 Hours

| Properties | $PO_4$ content* in % by weight | | | | | |
|---|---|---|---|---|---|---|
| | 0 | 1.5 | 2.8 | 8.1 | 16.6 | 23.0 |
| Surface Area in m²/g Standard BET method | 301 | 329 | 356 | 400 | 406 | 248 |
| Pseudoboehmite content in % by weight | 62 | 63 | 67 | 46 | 30 | amorphous |
| (020) spacings in A | 6.5 | 6.6 | 6.6 | 6.6 | 6.8 | — |
| Crystallite size in A | 33 | 32 | 32 | 32 | 14 | — |
| Loss on ignition* (LOI) % by weight | 22.1 | 22.2 | 22.5 | 23.0 | 25.7 | 22.6 |

*Determined after heating the composite to 1000°C for 1 hour

TABLE II

Physical Properties of $PO_4$-Stabilized Pseudoboehmitic Active Alumina After Exposure to 900°C for 70 Hours

| Properties | $PO_4$ content* in % by weight | | | | | |
|---|---|---|---|---|---|---|
| | 0 | 1.5 | 2.8 | 8.1 | 16.6 | 23.0 |
| Surface Area in m²/g Standard BET method | 130 | 174 | 186 | 198 | 204 | 102 |

*Determined after heating the composite to 1000°C for 1 hour

EXAMPLE II

The preparation of $PO_4$-stabilized pseudoboehmitic alumina was repeated by dissolving $Na_3PO_4$ in the sodium aluminate solution. A $PO_4$-stabilized sample was made, containing 9.2% by weight $PO_4$, and a control sample. The preparation of the stabilized pseudoboehmitic alumina and that of the control proceeded along the same lines as described in Example I. The dried and thermally treated stabilized pseudoboehmitic alumina was then subjected to the same tests as shown in Tables I and II and the test results are shown in Table III.

TABLE III

Physical Properties of PO₄-Stabilized Pseudoboehmitic Active Alumina*

| Properties | PO₄ content** in % by weight | |
|---|---|---|
| | 0 | 9.2 |
| Surface Area in m²/g 600°C/2 h | 300 | 411 |
| Standard BET method 900°C/70 h | 128 | 203 |
| Pseudoboehmite Content in % by weight | 62 | 47 |
| (020) Spacings in A | 6.5 | 6.7 |
| Crystallite size in A | 33 | 32 |
| Loss on ignition** (LOI) in % by weight | 22.1 | 27.2 |

*Prepared by adding Na₃PO₄ to the sodium aluminate solution
**Determined after heating the sample to 1000°C for 1 hour

EXAMPLE III

Phosphate stabilized pseudoboehmitic alumina was also prepared by the addition of ammonium dihydrogen phosphate, [(NH₄)H₂PO₄] to freshly precipitated pseudoboehmitic alumina. The freshly precipitated alumina was slurried to a solids content of 10% by weight and sufficient ammonium phosphate was added under agitation from a 4.5% aqueous (NH₄)H₂PO₄ solution to obtain a pseudoboehmitic alumina containing 5% of PO₄. The pseudoboehmitic alumina was then filtered, dried at 110°C for about 2 hours, then heated to about 600°C for about 2 hours. Subsequently, the phosphate stabilized pseudoboehmitic alumina was analyzed with the following results: PO₄ content: 4.62% by weight; BET surface area: 449 m²/g; pseudoboehmite content: 32% by weight; (020) spacing: 6.52 A; crystallite size: 28 A and loss on ignition (at 1000°C for 1 hour): 23.1% by weight.

This sample was then heated to 900°C for 70 hours and its surface area after this heat treatment was found to be 253 m²/g.

The selective isomerization characteristics of the phosphate stabilized pseudoboehmitic active alumina was also tested in comparison to silica stabilized active alumina. The silica stabilized active alumina was a commercially available active alumina of pseudoboehmitic structure having an SiO₂ content of 8.3% by weight (calculated on the weight of calcined composite). Other properties of this silica stabilized alumina are shown in Table IV. For purposes of comparison a phosphate stabilized pseudoboehmitic active alumina containing 8.1% by weight PO₄ was used. Other properties of this phosphate stabilized active alumina are shown in Table IV.

The isomerization characteristics of these aluminas were tested by employing neohexene (2,2-dimethyl-3-butene) which in the presence of an acidic active alumina catalyst at elevated temperature can be converted to 2,3-dimethyl-2-butene and to other isomers. The selectiveness of the acid catalyst is characterized by the quantity of 2,3-dimethyl butene formed. Preferred as those active alumina catalysts which produce predominantly the 2,3-dimethyl-2-butene and only a minor quantity of the undesired other isomers. Temperature affects the selectivity and also the total yield of isomerization. The instant neohexene isomerization test were conducted in a pulse reactor according to the process described in detail in the Journal of American Chemical Society, Vol. 82, page 2488 (1960) by H. Pines et al, using a pulse reactor described in the Journal of the American Chemical Society, Vol. 77, page 5860 (1955) by R. J. Kokes et al.

The results of the neohexene isomerization tests are shown in Table IV.

TABLE IV

Comparison of PO₄ and SiO₂-Stabilized Pseudoboehmitic Active Aluminas

| Properties | PO₄ content* in % by wt. | |
|---|---|---|
| | 8.1% PO₄ | 8.3% SiO₂ |
| Surface area m²/g 600°C/2 hrs. | 400 | 254 |
| standard BET method 900°C/70 hrs. | 198 | 174 |
| Pseudoboehmite content in % by weight | 46 | 33 |
| (020) spacing in angstroms | 6.6 | 6.56 |
| Loss on ignition in % by wt. at 1000°C for 1 hour | 23.0 | 21.0 |
| **% by wt. neohexene converted to other isomers | 0 | 15 |
| **% by wt. neohexene converted to 2,3-dimethyl-butene | 74 | 82 |
| ***% by wt. neohexene converted to other isomers | 0 | 24 |
| ***% by wt. neohexene converted to 2,3-dimethyl-butene | 68 | 67 |

*Determined after heating the composite to 1000°C for 1 hour
**Samples pretreated at 600°C for 2 hours
***Samples pretreated at 900°C for 88 hours These results not only indicate the superior stability of the phosphate stabilized pseudoboehmitic alumina, but also its capability of retaining its selectivity even under severe, high temperature applications.

What is claimed is:

1. A pseudoboehmitic alumina of high thermal stability, having selective isomerization properties, characterized by a uniformly distributed PO₄-content from about 1% to about 20% by weight calculated on the weight of the alumina when heated to 1000°C for 1 hour, a pseudoboehmite content of at least about 30% by weight as determined by X-ray diffraction using copper Kα radiation, wherein the diffraction peak of greatest intensity ($I/I_o$) is in the range of 6.5–6.8 A, a surface area of at least about 300 m²/g after heating the composite to 600°C for 2 hours.

2. The surface stabilized pseudoboehmitic alumina of claim 1, characterized by a PO₄-content from about 2% to about 18% by weight.

3. A process for producing a surface stabilized pseudobochmitic alumina which comprises:

a. forming an aqueous reaction mixture from a basic aluminum source selected from the group consisting essentially of sodium aluminate and potassium aluminate and an acid and incorporating in the mixture a phosphate ion yielding compound of the general formula $A_xH_yPO_4$ wherein A is selected from the group consisting essentially of Na, K, Li and NH₄; and wherein x and y are whole numbers from 0 to 3 and the sum of $x + y$ is equal to 3, and wherein for NH₄ x is 1 and 2, in an amount sufficient to produce a pseudoboehmitic alumina containing from about 1% to about 20% by weight PO$_4$-content calculated on the weight of the composite when heated to 1000°C for 1 hour, b. recovering the PO$_4$-containing pseudoboehmitic alumina followed by drying within a temperature range from about 110°C to about 140°C, and c. thermally treating the dried pseudoboehmitic alumina within a temperature range from about 300°C to about 600°C, from 30 minutes to about 3 hours.

4. Process according to claim 3, wherein the A$_x$H$_y$PO$_4$ compound is added in an amount sufficient to produce a stabilized pseudoboehmitic alumina containing from about 2% to about 18% by weight of PO$_4$.

5. Process according to claim 3, wherein the basic aluminum source is sodium aluminate, the A$_x$H$_y$PO$_4$ compound is selected from the group consisting essentially of Na$_3$PO$_4$, Na$_2$HPO$_4$ and NaH$_2$PO$_4$ and wherein the A$_x$H$_y$PO$_4$ compound is incorporated in the sodium aluminate prior to forming the reaction mixture.

6. Process according to claim 3, wherein the acid is nitric acid and the A$_x$H$_y$PO$_4$ compound is H$_3$PO$_4$ and wherein the H$_3$PO$_4$ is incorporated in the nitric acid prior to forming the reaction mixture.

7. A process for producing a surface stabilized pseudoboehmitic alumina exhibiting increased thermal stability and possesing selective isomerization characteristics from pseudoboehmite characterized by a pseudoboehmite content of at least about 30% by weight as determined by X-ray diffraction using copper K$\alpha$ radiation, wherein the diffraction peak of greatest intensity (I/I$_o$) is in the range of 6.5–6.8 A which comprises:

a. adding to pseudoboehmitic alumina a phosphate ion yielding compound having the general formula of A$_x$H$_y$PO$_4$, wherein A is selected from the group consisting essentially of Na, K, Li and NH$_4$; and wherein the sum of $x + y$ is 3 and $y$ is 0, 1, or 2, where A is NH$_4$, $x$ is 1 or 2, in an amount sufficient to produce a phosphate stabilized pseudomitic alumina having a pseudoboehmite content of at least about 30% by weight and a PO$_4$-content from about 1% to about 20% by weight calculated on the weight of the composite when heated to 1000°C for 1 hour;

b. uniformly distributing the A$_x$H$_y$PO$_4$ in the pseudoboehmitic alumina followed by drying within a temperature range from about 110°C to about 140°C; and c. thermally treating the dried alumina within a temperature range from about 300°C to about 600°C from about 30 minutes to about 3 hours.

8. Process according to claim 7, wherein the pseudoboehmitic alumina is in an aqueous slurry.

9. Process according to claim 7, wherein the pseudoboehmitic alumina is a filter cake.

10. Process according to claim 7, wherein the pseudoboehmitic alumina is an alumina dried within a temperature range from about 110°C to about 140°C prior to addition of the A$_x$H$_y$PO$_4$ compound.

11. Process acccording to claim 7, wherein the phosphate stabilizer incorporated in the pseudoboehmitic alumina is selected from the group consisting essentially of (NH$_4$)$_2$HPO$_4$ and (NH$_4$)H$_2$PO$_4$.

* * * * *